United States Patent
Satta et al.

(10) Patent No.: US 7,699,399 B2
(45) Date of Patent: Apr. 20, 2010

(54) SEAT APPARATUS

(75) Inventors: Hiroki Satta, Ichinomiya (JP);
Hidemitsu Higashi, Kariya (JP);
Masaya Mizuguchi, Chiryu (JP);
Hideharu Kato, Toyota (JP); Tomonori Suzuki, Aichi (JP)

(73) Assignees: Aisin Seiki Kabushiki Kaisha, Kariya-shi, Aichi (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 123 days.

(21) Appl. No.: 11/509,708

(22) Filed: Aug. 25, 2006

(65) Prior Publication Data

US 2007/0052273 A1    Mar. 8, 2007

(30) Foreign Application Priority Data

Aug. 30, 2005    (JP)    ............................... 2005-249705

(51) Int. Cl.
*B60N 2/30*    (2006.01)
*B60N 2/02*    (2006.01)

(52) U.S. Cl. ............................... 297/378.12; 297/362.11; 296/65.01

(58) Field of Classification Search ............... 297/14, 297/15, 378.12, 217.3, 362.11, 362.14; 296/65.01; 318/286, 466–469, 626, 264–267
See application file for complete search history.

(56) References Cited

U.S. PATENT DOCUMENTS

| | | | | |
|---|---|---|---|---|
| 155,901 A | * | 10/1874 | Tetley | 297/15 |
| 5,452,868 A | * | 9/1995 | Kanigowski | 244/122 R |
| 5,971,475 A | * | 10/1999 | Lawson et al. | 297/85 |
| 6,070,934 A | * | 6/2000 | Schaefer et al. | 297/14 |
| 6,095,609 A | * | 8/2000 | Magadanz | 297/378.12 |
| 6,106,046 A | * | 8/2000 | Reichel | 296/65.09 |
| 6,106,067 A | * | 8/2000 | Zhuang et al. | 297/361.1 |
| 6,199,951 B1 | * | 3/2001 | Zeile et al. | 297/341 |
| 6,293,603 B1 | * | 9/2001 | Waku et al. | 296/65.09 |
| 6,320,342 B1 | * | 11/2001 | Yoshioka et al. | 318/467 |
| 6,382,491 B1 | * | 5/2002 | Hauser et al. | 296/65.05 |
| 6,439,636 B1 | * | 8/2002 | Kuo | 296/65.09 |
| 6,644,730 B2 | * | 11/2003 | Sugiura et al. | 297/15 |
| 6,690,131 B1 | * | 2/2004 | Shimomura et al. | 318/445 |
| 6,883,854 B2 | * | 4/2005 | Daniel | 296/65.03 |
| 7,023,108 B2 | * | 4/2006 | Itami et al. | 307/10.1 |
| 7,053,575 B2 | * | 5/2006 | Fukuhara et al. | 318/538 |
| 7,063,368 B2 | * | 6/2006 | Kayumi | 296/65.05 |
| 7,099,761 B2 | * | 8/2006 | Woller et al. | 701/49 |

(Continued)

FOREIGN PATENT DOCUMENTS

JP    10-287160 A    10/1998

(Continued)

*Primary Examiner*—Sarah B McPartlin
(74) *Attorney, Agent, or Firm*—Buchanan Ingersoll & Rooney PC

(57) ABSTRACT

A seat apparatus includes a seat back capable of being used as a table at a surface thereof, a seat back driving device moving the seat back between a seating position and a table position, a controlling portion controlling the seat back driving device, and the controlling portion including an operating portion at which the user executes a certain operation, wherein, when the user executes the certain operation, the controlling portion controls the seat back to move in a first direction that is opposite to a second direction to which the seat back is moved most recently.

4 Claims, 5 Drawing Sheets

U.S. PATENT DOCUMENTS

| | | | |
|---|---|---|---|
| 7,100,984 B2 * | 9/2006 | Epaud et al. | 297/341 |
| RE39,315 E * | 10/2006 | Kamida et al. | 296/63 |
| 7,134,723 B2 * | 11/2006 | Padberg et al. | 297/341 |
| 7,243,996 B2 * | 7/2007 | Daniels | 297/378.12 |
| 7,246,856 B2 * | 7/2007 | Kruse et al. | 297/330 |
| 7,270,375 B2 * | 9/2007 | Lutzka et al. | 297/331 |
| 7,273,243 B2 * | 9/2007 | Prugarewicz | 296/65.09 |
| 7,306,278 B2 * | 12/2007 | Holdampf | 296/65.09 |
| 7,320,501 B2 * | 1/2008 | Keyser et al. | 297/378.12 |
| 7,328,939 B2 * | 2/2008 | Moriyama et al. | 297/15 |
| 2001/0040400 A1 | 11/2001 | Kamida et al. | |
| 2004/0140705 A1 * | 7/2004 | McMillen et al. | 297/378.1 |
| 2004/0195892 A1 * | 10/2004 | Daniels | 297/378.1 |
| 2005/0035621 A1 | 2/2005 | Moriyama et al. | |
| 2005/0057082 A1 * | 3/2005 | Hatta et al. | 297/341 |
| 2005/0269843 A1 * | 12/2005 | McGowan et al. | 297/15 |
| 2006/0097560 A1 * | 5/2006 | Keyser et al. | 297/378.12 |
| 2006/0103174 A1 * | 5/2006 | Queveau et al. | 297/15 |
| 2006/0181113 A1 * | 8/2006 | Perin | 297/15 |
| 2006/0214477 A1 * | 9/2006 | Fukada et al. | 297/15 |
| 2006/0220432 A1 * | 10/2006 | Sundstrom | 297/378.12 |
| 2006/0250014 A1 * | 11/2006 | Daniels | 297/378.12 |
| 2007/0046074 A1 * | 3/2007 | Satta et al. | 297/15 |
| 2007/0236068 A1 * | 10/2007 | Deissmann et al. | 297/378.14 |

FOREIGN PATENT DOCUMENTS

| | | |
|---|---|---|
| JP | 2001-322461 A | 11/2001 |
| JP | 2004-196163 A | 7/2004 |

* cited by examiner

SEAT APPARATUS

CROSS REFERENCE TO RELATED APPLICATIONS

This application is based on and claims priority under 35 U.S.C. §119 to Japanese Patent Application 2005-249705, filed on Aug. 30, 2005, the entire content of which is incorporated herein by reference.

FIELD OF THE INVENTION

The present invention relates to a seat apparatus for a vehicle having a characteristic method for operating a seat back so as to be in a certain position.

BACKGROUND

Various types of seat apparatuses for storing a seat in a storage portion provided within a vehicle have been proposed so far. For example, a vehicle seat disclosed in JP2004196163A illustrated in FIG. 5 includes a seat main body having a seat cushion 92 and a seat back 93. As shown in FIG. 5, when the seat main body positioned at the seating position is not used, it can be moved so as to be stored into a concave portion 95 that is formed on the vehicle floor 94. While the vehicle seat has been operated to be stored in the concave portion 95, the seat back 93 of the vehicle seat is rotated so as to overlap the seat cushion 92.

While the vehicle seat is in a seating position, the seat back 93 can serve as a table in a manner where it is rotated so as to overlap the seat cushion 92. This position is indicated as a table position. The seat apparatus serving as a table is also disclosed in, for example each JP2001322461A and JP10287160A. Usage of such seat apparatus serving as a table when the seat main body is rotated so as to overlap the seat cushion is not limited to the stored-type seat, and it has been applied to various types of seats The seat apparatus includes an electric seat actuated by electric power. The seat back of such electric seat is generally operated in two manners; one is a reclining operation by which a reclining mechanism of the seat apparatus is controlled to tilt while a user seats on the electric seat, the other is an operation by which the seat back is moved between the seating position and the table position at which the seat back serves as a table. Because each operation has a substantially different characteristic, it is appropriate to use a different switch for each operation.

In order to reduce the cost of the seat apparatus, the operation to move the seat back from the seating position to the table position and the operation to move the seat back from the table position to the seating position is executed by pressing one operation switch. Specifically, if the operation switch is pressed when the seat back is located in the vicinity of the table position, the seat back is moved toward the seating position, and if the operation switch is pressed when the seat back is located in the vicinity of the seating position, the seat back is moved toward the table position. Further, if the operation switch is pressed while the seat back is moving, the seat back is stopped, and at this point, if the operation switch is pressed again, the moving direction of the seat back is determined depending on the position of the seat back at the time.

In this configuration however, when the seat back moving in a first direction is controlled to move in a second direction, which is an opposite direction of the first direction, the seat back needs to be moved further in the first direction for a while, and then the direction of the seat back is switched to the second direction. Thus, it has been considered that such seat apparatus is poor in operability.

A need thus exists to provide a seat apparatus that has an appropriate operationality.

SUMMARY OF THE INVENTION

According to an aspect of the present invention, a seat apparatus includes a seat back capable of being used as a table at a surface thereof, a seat back driving device moving the seat back between a seating position and a table position, a controlling portion controlling the seat back driving device, and the controlling portion including an operating portion at which the user executes a certain operation, wherein, when the user executes the certain operation, the controlling portion controls the seat back to move in a first direction that is opposite to a second direction to which the seat back is moved most recently.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
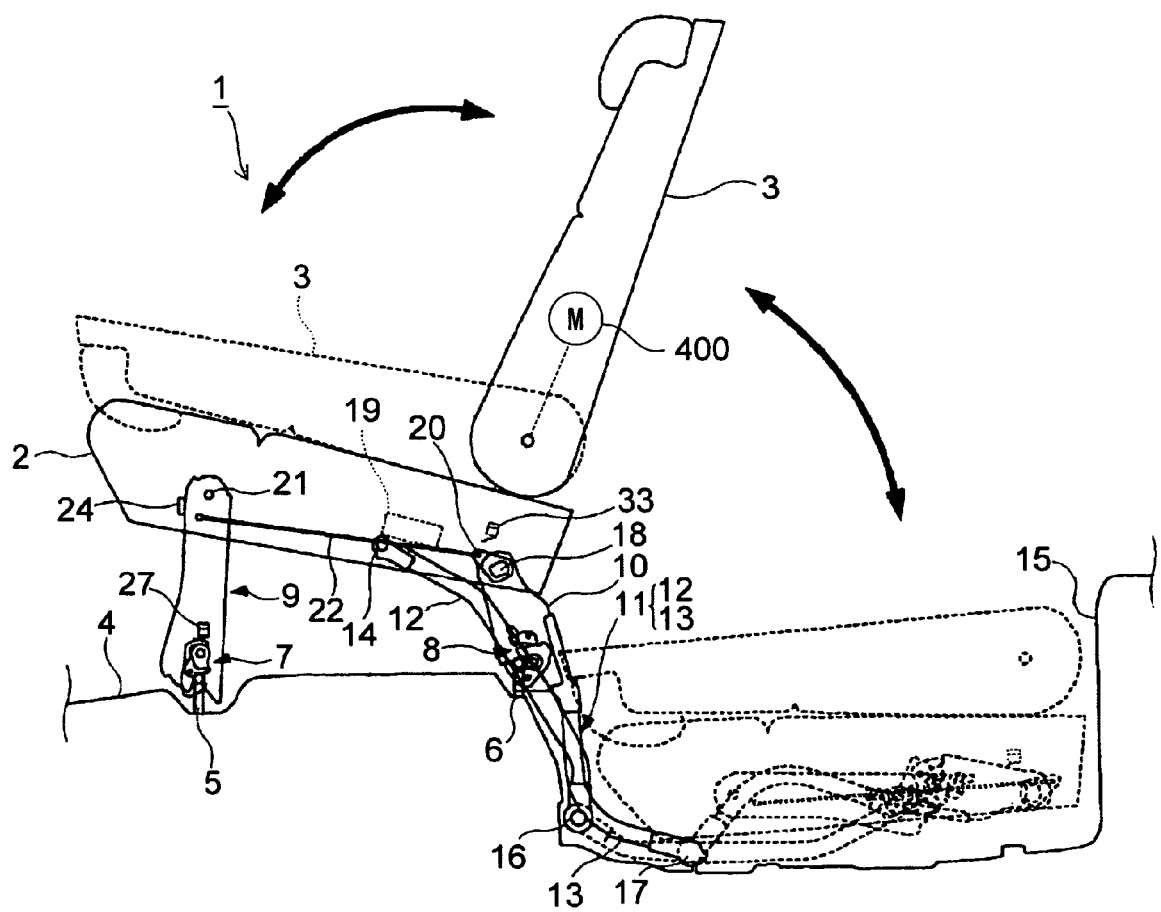
FIG. 1 Illustrates a pattern diagram indicating a seat apparatus of the embodiment moving between a seating position and a stored position.
Figure 2:
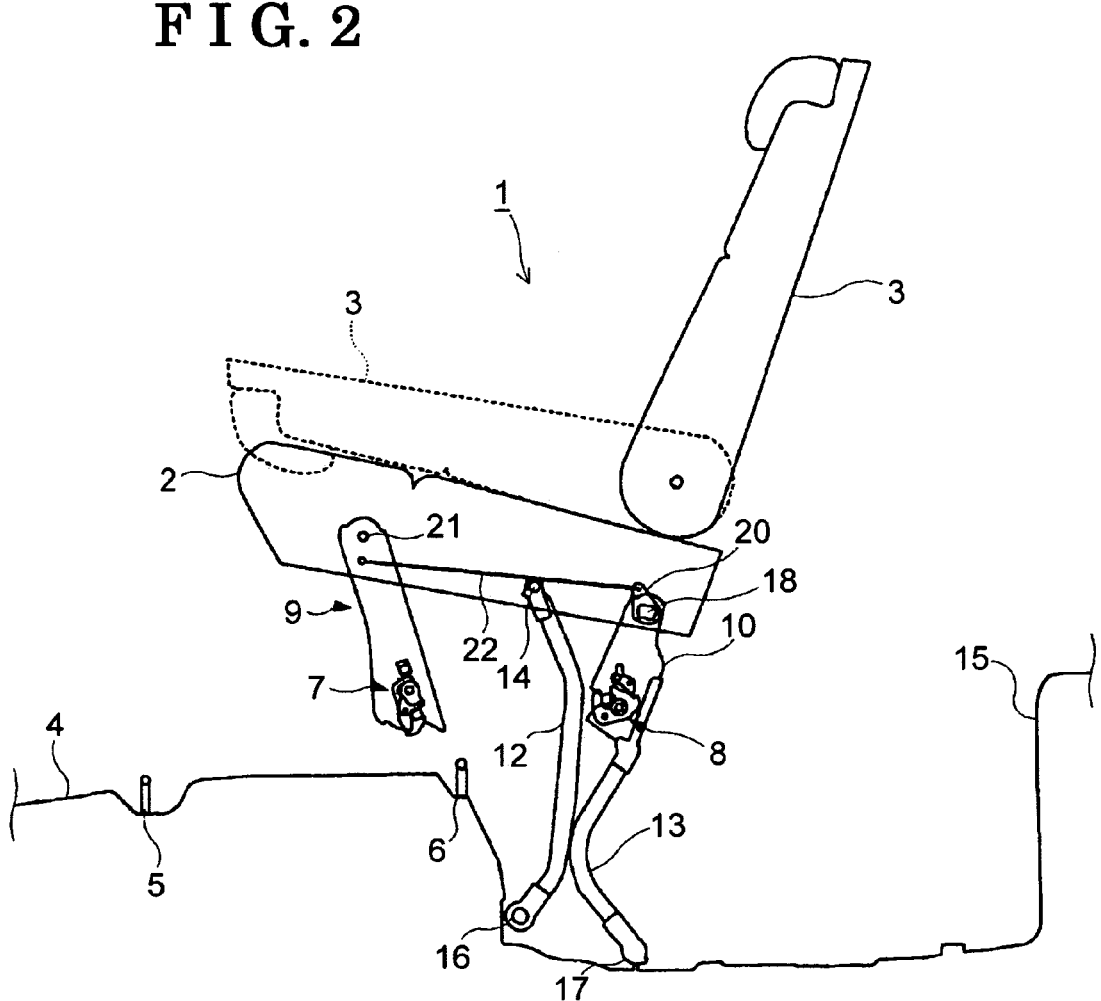
FIG. 2 illustrates a pattern diagram indicating the seat apparatus of the embodiment while it is moving between the seating position and the stored position.

A seat apparatus according to the present invention will be explained. The seat apparatus of the present invention includes a seat cushion, a seat back, a seat back driving device, a controlling portion and other means that are adopted if necessary.

The seat cushion is adapted to face user's hip, the seat back is adapted to face user's back at a front surface thereof. A back surface of the seat back is adapted to be used as a table.

The seat back is supported at a lower end portion thereof by the seat cushion at a rear end portion thereof so as to rotate in a front-rear direction of the seat apparatus.

The seat back can be rotated to be in a table position at which the front surface of the seat back contacts a seating surface of the seat cushion so that the back surface of the seat back becomes approximately horizontal. The seat back can be rotated from the table position at which the seat back overlaps the seat cushion by an angle of 180 degrees. The position where the seat back is approximately upright, and at which the user generally seats, is indicated as a seating position.

The seat back driving device, which is generally configured of an electric motor, is a means for rotating the seat back so as to change the angle thereof relative to the seat cushion. The controlling portion is a means for controlling the seat back driving device. The controlling portion includes a means for detecting the current position of the seat back, which is used for controlling the seat back driving device. For example, a rotary encoder is provided at a rotating shaft of an electric motor used at the seat back driving device, or provided at the supporting portion where the seat back is supported by the seat cushion. By means of the rotary encoder, a current angle of the seat back relative to the seat cushion is detected. Further, a stepping motor may be provided as an electric motor by which a rotating angle thereof can be tracked.

The controlling portion includes an operating portion by which an operation signal is outputted when a user actuates the operating portion. The operating portion includes an automatic returning switch such as a push button switch. The controlling portion controls the seat back driving device on the basis of the operation signal outputted by the operating portion. For example, when the automatic returning switch served as the operating portion is pressed, the seat back is rotated while the user has been pressing the switch, or, once the switch is pressed, the seat back has been rotated until it reaches the seating position or the table position.

The rotating direction of the seat back can be determined as follows. The controlling portion controls the seat back driving device so as to rotate in a direction that is opposite to the direction to which the seat back was rotated most recently. For example, when an operation signal is outputted to the controlling portion while the seat back has been rotated by means of the seat back driving device from the seating position to the table position, the controlling portion controls the seat back driving device so as to rotate the seat back toward the seating position.

On the other hand, when an operation signal is outputted to the controlling portion while the seat back has been rotated by means of the seat back driving device from the table position to the seating position, the controlling portion controls the seat back driving device so as to rotate the seat back toward the table direction.

For example, for every two times the operation signal is inputted into the controlling portion, the seat back driving device may be controlled so as to stop the seat back. Specifically, when the user operates the operating portion while the seat back is rotated, the seat back driving device may be controlled so as to stop the seat back, and then the seat back driving device may be controlled so as to rotate again the seat back in a direction which is opposite to the direction to which the seat back was rotated before it is stopped, on the basis of a second operation signal. Thus, because the rotation of the seat back can be stopped, it gives the user time to think how to the seat back, resulting in a safe seat back operation.

The controlling portion may further include a seat back fine-adjustment operating portion. The seat back fine-adjustment operating portion is a means for supplying a fine-adjustment signal to the controlling portion in order to finely adjust an angle of the seat back relative to the seat cushion. In this configuration, the angle of the seat back can be finely adjusted, in other words, the seat back can be reclined, by means of the seat back driving device while a user seats on the seat apparatus. Because the purpose of usage of the operating portion significantly differs from the purpose of usage of the seat back fine-adjustment operating portion, it is better to operate each portion by each means respectively. The seat back fine-adjustment operating portion controls the seat back to recline within a range at which the user is able to seat.

When the operating portion is operated for the first time since the seat back fine-adjustment operating portion is operated, the controlling portion rotates the seat back toward a table position. Specifically, because the seat back fine-adjustment operating portion is generally operated while a user seats on the seat apparatus (seating position), after the seat back fine-adjustment operating portion is operated, it is generally considered that the user intends to rotate the seat back from the seating position to the table position.

An example of the embodiment related to the present invention will be further explained in accordance with the attached drawings. As shown in FIG. 1, the seat main body 1 includes a seat cushion 2 and a seat back 3. The seat back 3 is supported by the seat cushion 2 in a manner where a lower end portion of the seat back 3 is supported by a rear end portion of the seat cushion 2 so that the seat back 3 can rotate relative to the seat cushion 2.

Thus, the seat back 3 can be rotated forward so as to overlap the seat cushion 2 as indicated by a dashed line illustrated in FIG. 1. When the seat back 3 is rotated forward so as to overlap the seat cushion 2, because a back surface of the seat back 3 can be used as a table, this position of the seat back 3 indicated by the dashed line at left of FIG. 1 is referred to as a table position. On the other hand, the position of the seat back 3 that is approximately upright relative to the seat cushion 2 indicated by a solid line in FIG. 1 is referred to as a seating position. The seat back 3 positioned at the seating position can be further rotated backward.

Figure 3:
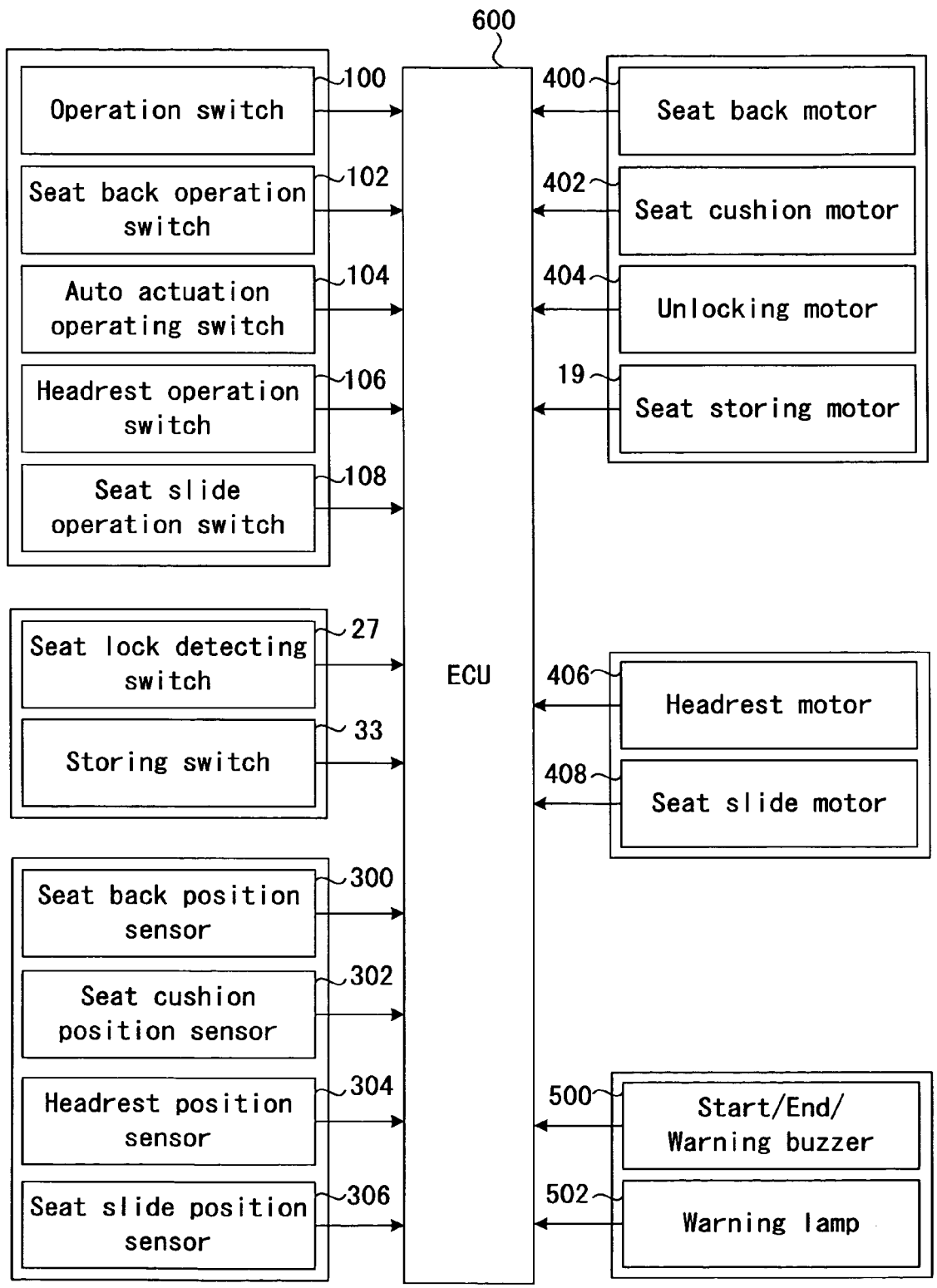
FIG. 3 illustrate a block diagram of a controlling portion of the seat apparatus.

The seat main body 1 including the seat back 3 and the seat cushion 2 has a device for stopping an unrestrained movement of the seat body 1 caused by an external force, a seat cushion motor 402 for moving the seat cushion 2, and a seat back motor 400 for moving the seat back 3. The seat back motor 400 serves as a seat back driving device. The seat cushion motor 402 serves as a seat cushion driving device. The device for stopping an unrestrained movement is not illustrated, and the seat cushion motor 402 and the seat back motor 400 are illustrated in FIG. 3.

The seat main body 1 further includes an ECU 600 (shown in FIG. 3) having a controlling portion as logic for controlling the seat back motor 400. In this embodiment, the seat back motor 400 and a seat storing motor 19 are provided individually, however, the seat storing motor 19 may not be provided, and the seat back motor 400 may serve both as a motor for moving the seat back 3 and a motor for restoring the seat main body 1.

The seat cushion 2 includes a seat cushion frame (not shown) at the bottom surface thereof. The seat cushion frame includes a pair of front legs 9 and a pair of rear legs 10. Specifically, the front legs 9 are provided at the front portion of the seat cushion frame so as to be paired in a seat width direction, and the rear legs 10 are provided at the rear portion of the seat cushion frame so as to be paired in a seat width direction. Each of the front legs 9 includes a latch 7, and each of the rear legs 10 includes a latch 8. Each latch 7 is engageable with a striker 5 provided on the vehicle floor 4, and each latch 8 is engageable with a striker 6 provided on the vehicle floor 4. The strikers 5 and 6 are provided so as to protrude from the vehicle floor 4. The seat body 1 is fixed on the vehicle floor 4 in a manner where each of the latches 7 and 8 of the seat cushion 3 engaged with each of the strikers 5 and 6 provided on the vehicle floor 4.

Two supporters 11 are attached at the bottom surface of the seat cushion 2 so as to be paired in a seat width direction. Specifically, one of supporters 11 is attached at a left portion of the bottom surface, and the other of supporters 11 is attached at a right portion of the bottom surface. Each supporter 11 configures a four parallel link mechanism, which is comprised of a first link 12 and a second link 13.

A configuration of the supporter 11 provided at a left side will be explained in detail below. However, the supporter 11 provided at a right side has the same configuration. One end of the first link 12 is supported by the seat cushion frame of the seat cushion 2 at a pivoting point 14, and the other end of the first link 12 is supported by a seat storage space 15 at a pivoting point 16. On end of the second link 13 is fixed by the rear leg 10, and the other end of the second link 13 supported by the seat storage space 15 at a pivoting point 17.

The pair of rear legs 10 is supported by the seat cushion frame so as to rotate relative to a shaft 18, and the shaft 18 is rotated by means of the seat storing motor 19 supported at the seat cushion frame. The seat storing motor 19 is controlled by the ECU 600. When the shaft 18 is rotated by means of the seat storing motor 19, the rear leg 10 fixed to the shaft 18, and the second link 13 fixed to the rear leg 10, are rotated relative to the seat cushion 2. A seating position sensor 302 shown in FIG. 3 is provided at the shaft 18. Specifically, the seating position sensor 302 serves as a rotary encoder to supply a signal indicating an angle to the ECU 600 so that an angle of the shaft 18 relative to the seat cushion 2 can be measured.

The front leg 9 is supported by the seat cushion frame at a pivoting point 21 so as to rotate relative thereto. A bracket 20 is fixed to the shaft 18, and is connected by a twisted line cable 22 to the front legs 9 at a point located below the pivoting point 21. Thus, the front leg 9 is biased by a spring (not shown) so as to rotate in a clockwise direction in FIG. 1, however, the rotation is regulated by a stopper 24. Thus, the front leg 9 is rotated in accordance with the rotation of the bracket 20, in other words the rotation of the rear leg 10, by means of the twisted line cable 22 and the spring. The latches 7 provided at the front legs 9 includes a seating lock detecting switch 27 for outputting a signal that indicates that the front leg is secured in a locked state as shown in FIG. 1.

The controlling portion includes logic installed in the ECU 600 as shown in FIG. 3.

The ECU 600 is connected to an operation switch 100 for moving the seat main body 1 between the storing position and the seating position, a seat back operation switch 102 (e.g., serving as a seat back fine-adjustment operating portion) for finely adjusting an angle of the seat back 3 relative to the seat cushion 2, an auto actuation operating switch 104 (e.g., serving as an operating portion) for rotating the seat back 3 between the table position and the seating position, a headrest operation switch 106 for finely adjusting the position of the headrest, and a seat slide operation switch 108 for finely adjusting the position of the seat cushion 2 in a front-rear direction and in a vertical direction. Signals detected at each switch are outputted into the ECU 600.

Further, the ECU 600 is connected to a seating lock detecting switch 27 and a storing switch 33. The seating lock detecting switch 27 detects that the latch 7 of the front leg 9 of the seat main body 1 engages the striker 5, and the latch 8 of the rear leg 10 of the seat main body 1 engages the striker 6. The storing switch 33 generates a signal indicating that the seat main body 1 is stored within the seat storage space 15 at a stored position.

The ECU 600 is further connected to the seat back position sensor 300 for detecting an angle of the seat back 3 relative to the seat cushion 2, a seat cushion position sensor 302 for detecting a position of the seat main body 1 between a stored position and a seating position, a headrest position sensor 304 for detecting the position of the headrest, and the seat slide position sensor 306 for detecting a position of the seat cushion 2.

The ECU 600 controls a seat back motor 400 for adjusting the angle of the seat back 3 relative to the seat cushion 2, a seat cushion motor 402 for adjusting the position of the seat cushion 2, an unlocking motor 404, a headrest motor 406 for finely adjusting the position of the headrest, a seat slide motor 408 for finely adjusting the position of the seat, and a seat storing motor 19 storing the seat main body 1.

Figure 4:
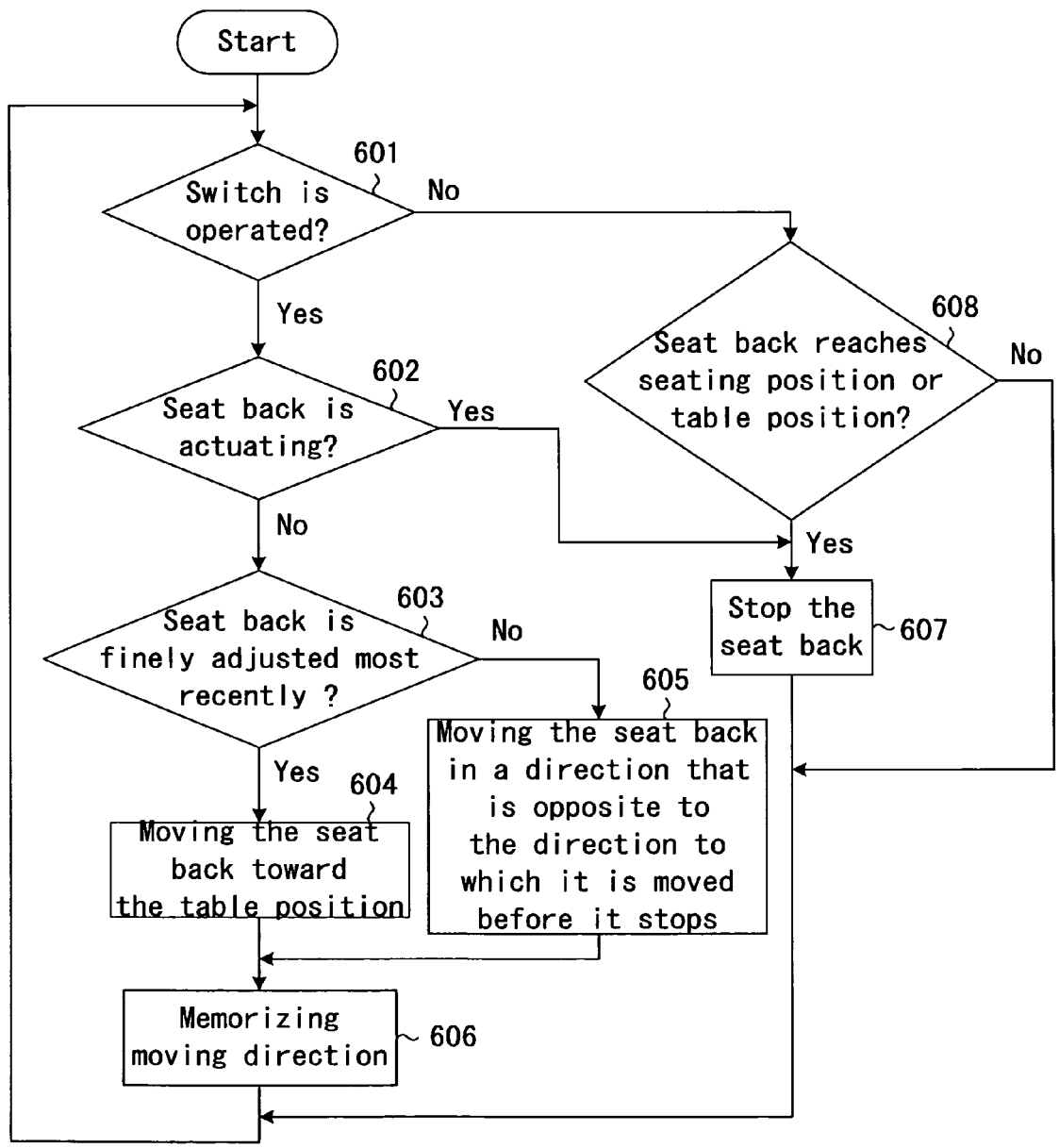
FIG. 4 illustrates a flow chart executed by the controlling portion.
Figure 5:
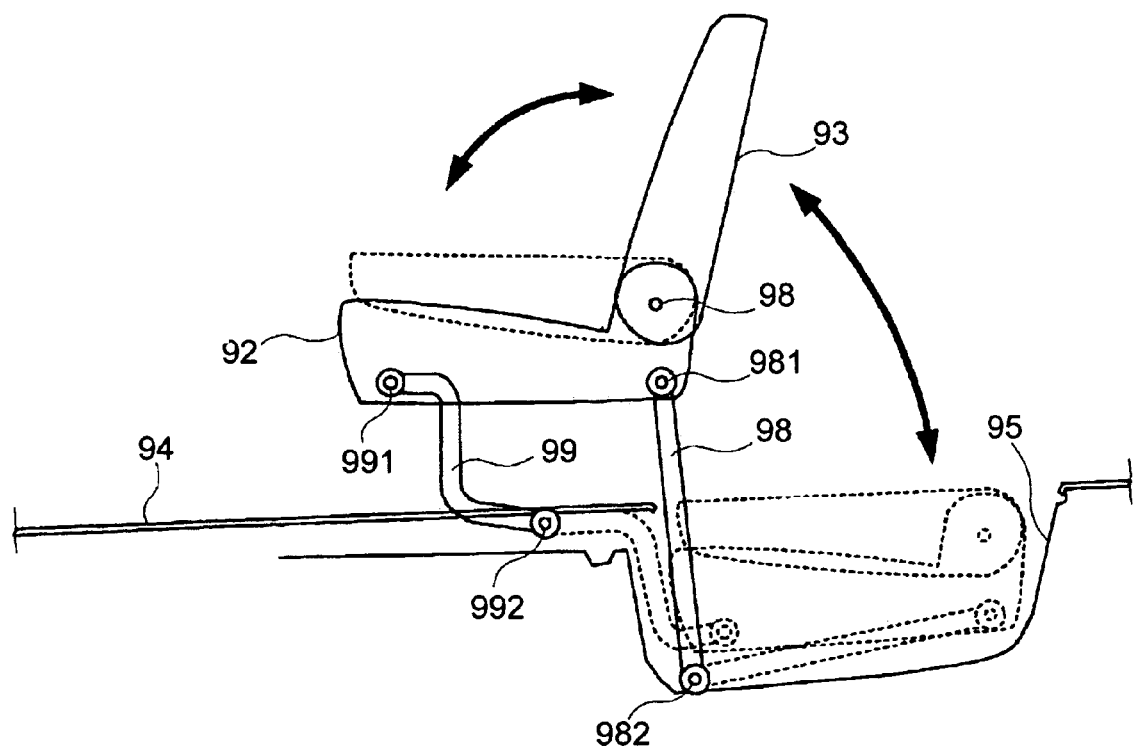
FIG. 5 illustrates a block diagram indicating a seat apparatus related to a prior art.

The controlling portion is operated so as to follow a flow chart illustrated in FIG. 4. In Step 601, it is detected whether or not the auto actuation operating switch 104 is operated. When it is detected that auto actuation operating switch 104 is operated, the process goes to Step 602. In Step 602, it is determined whether or not the seat back 3 is actuated so as to move. When it is determined that the seat back 3 is not actuated, the process goes to Step 603. In Step 603, it is determined whether or not the seat back is finely adjusted immediately before the operation of the auto actuation operating switch 104. When it is determined the seat back is finely adjusted immediately before the operation of the auto actuation operating switch 104, the process goes to Step 604. When it is determined the seat back is not finely adjusted immediately before the operation of the auto-actuation operating switch 104, the process goes to Step 605. In step 604, the controlling portion controls the seat back motor 400 to be energized so as to rotate the seat back 3 toward the table position. Then, the process goes to Step 606. On the other hand, in step 605, the controlling portion controls the seat back motor 400 to be energized so as to rotate the seat back 3 in a direction that is opposite to the direction to which the seat back 3 was rotated before it is stopped. Then, the process goes to Step 606. In Step 606, the rotating direction is memorized, and the process goes back to Step 601. In Step 602, it is determined that the seat back 3 is actuated, the process goes to Step 607. In Step 607, the seat back motor 400 is stopped in order to stop the rotation of the seat back 3.

In Step 601, when it is determined that the auto actuation operating switch 104 is not operated, the process goes to Step 608. In Step 608, it is determined whether or not the seat back 3 reaches the seating position or the table position. When it is determined that the seat back 3 reaches the seating position or the table position, the process goes to Step 607. In Step 607, the seat back motor 400 is stopped in order to stop the rotation of the seat back 3.

While the seat back motor 400 is energized, a start/end/ warning buzzer 500 may be sounded, and a warning lamp may be lighted or blinked.

An operation of the seat back 3 will be explained. When the seat main body 1 is in a seating position (a position indicated by the solid line in FIG. 1), and a user operates the auto-actuation operating switch 104, because the seat back 3 is not actuated at this point, the seat back 3 is moved in accordance with the result of whether or not the seat back fine-adjustment operation is executed immediately before the operation of the auto-actuation operating switch 104. When the seat back 3 is moved from the table position to the seating position immediately before the operation of the auto-actuation operating switch 104, the seat back 3 is moved toward the table position. When the switch is operated while the seat back 3 is moved, the seat back 3 is stopped. At this point, if the auto-actuation operating switch 104 is operated again, the seat back 3 is moved toward the seating position that is opposite to the direction to which the seat back 3 was moved immediately before the second operation of the auto-actuation operating switch 104. When the auto-actuation operating switch 104 is not operated while the seat back 3 is moving, the seat back 3 reaches the table position and stops thereat.

If the user operates the auto-actuation operating switch 104 when the seat main body 1 is located at the table position, because the seat back 3 is not moved at this point, the seat back 3 is moved toward the seating position. While the seat back 3 is moved toward the seating position, if the auto-actuation operating switch 104 is operated, the seat back 3 is stopped. At this point, if the auto-actuation operating switch 104 is operated again, the seat back 3 is moved toward the table position that is opposite to the direction to which the seat back 3 was moved immediately before the second operation of the auto-actuation operating switch 104. When the auto-actuation operating switch 104 is not operated while the seat back 3 is moving, the seat back 3 reaches the seating position and stops thereat.

Thus, when the user operates the auto-actuation operating switch 104, the seat back 3 is rotated to a direction that is opposite to the direction to which the seat back 3 was rotated most recently. Specifically, when the auto-actuation operating switch 104 is operated after the seat back 3 is rotated toward the seating position (rotated forward), the seat back 3 is rotated toward the table position (rotated forward).

On the other hand, when the auto-actuation operating switch 104 is operated after the seat back 3 is rotated toward the table position, the seat back 3 is rotated toward the seating position. Further, when the auto-actuation operating switch 104 is operated while the seat back 3 is rotated, the seat back 3 is stopped (stopping operation). At this point, when the auto-actuation operating switch 104 is operated again, the seat back is rotated in a direction that is opposite to the direction to which the seat back 3 is rotated immediately before the stopping operation (opposite to the direction to which the seat back 3 was rotated most recently).

In the flow chart illustrated in FIG. 4, Step 602 may be skipped, and after the operation of the auto-actuation operating switch 104 is detected in Step 601, the process goes to Step 603. In this case, when the auto-actuation operating switch 104 is operated while the seat back 3 is moved, the direction of the seat back 3 to move is switched to the opposite direction without stopping.

When the auto actuation operating switch 104 is operated after the angle of the seat back 3 is finely adjusted while the user seats on the seat main body 1, the seat back 3 is rotated forward, in other words, the seat back 3 is rotated toward the table position, not depending on the direction to which the seat back 3 is moved most recently.

When the seat back 3 is in the seating position indicated by a solid line in FIG. 1 (or positioned backward relative to the seating position), the seat back 3 may be rotated forward not depending on the most recent moving direction.

In this case, the position of the seat back 3 is detected in Step 603, and if the seat back 3 is located backward relative to the seating position, the process may go to Step 604.

If the seat back 3 is moved backward relative to the seating position by means of the seat back fine-adjustment operating portion, this modification is not needed. When the seat back 3 is in the table position indicated by the dashed line in FIG. 1, because the seat back 3 was moved toward the table position before it is stopped, the seat back 3 is rotated backward when the auto actuation operating switch 104 is operated.

Thus, the seat back 3 is controlled to move in a certain direction in accordance with the user's attempt not depending on the position of the seat back 3.

The storing operation will be explained in detail. When the operation switch 100 is turned on in order to store the seat 1, the seat back 3 is rotated forward. While the seat back 3 is rotated forward, an actuator (not shown) is turned on, and then the latch 8 disengages the striker 6, at the same time, the seat storing motor 19 is actuated in order to actuate the shaft 18.

Thus, the rear leg 10 is rotated relative to the shaft 18 in a clockwise direction, and the bracket 20 is also rotated in a clockwise direction. In accordance with the rotation of the bracket 20, the twisted line cable 22 is pulled rightward, then the front leg 9 is rotated in an anticlockwise direction relative to the pivoting point 21. In accordance with the rotation of the front leg 9, the latch 7 disengages the striker 5.

When the seat storing motor 19 is actuated, the front leg 9 and the rear leg 10 are moved so as to be close each other at free ends thereof, at the same time, the rear leg 10 and the second link 13 integrated with the rear leg 10 are rotated relative to the pivoting point 17 in a clockwise direction, and thus, the seat main body 1 is stored into the storage space 15 as indicated by a dashed line in FIG. 1 by means of the supporter 11, which has a four parallel link mechanism.

According to the present invention, a seat back facing user's back at a rear surface thereof and used as a table at a front surface thereof, a seat back driving device moving the seat back between a seating position and a table position in a manner where an angle of the seat back relative to the seat cushion is changed, and a controlling portion controlling the seat back driving device.

The seat apparatus according to the present invention moves the seat back between the seating position and the table position in a manner where, on the basis of the control by the controlling portion, the seat back driving device changes the position of the seat back between the seating position and the table position.

The controlling portion includes an operating portion. When the user executes a certain operation at the operating portion, the operating portion outputs an operation signal to the controlling portion. On the basis of the operation signal, the controlling portion operates the seat back driving device. Specifically, when the user executes the certain operation, the seat back is controlled to move in a first direction that is opposite to a second direction to which the seat back is moved most recently.

According to the know seat apparatus, when an operation signal is outputted from the operating portion, the seat apparatus has determined the moving direction of the seat back on the basis of the position of the seat back at the time. According to the present invention, the seat apparatus determines the moving direction of the seat back to one direction that is opposite to the direction to which the seat back is moved most recently. "The direction to which the seat back is moved most recently" means a direction to which the seat back is moved most recently on the basis of the operation signal supplied by the operating portion.

It is confirmed that, when the user operates the operating portion again after the user operates the operating portion in order to move the seat back between the seating position and the table position, the user probably intend to reverse the actuation of the seat back. Thus, according to the present invention, the moving direction of the seat back is determined on the basis of the direction to which the seat back is moved most recently. Thus, the operationality can be improved.

If the user operates the operating portion twice although he/she intends to move the seat back in the same direction to the direction of the most recent movement, the user can move the seat back in the same direction by operating the operating portion further again.

According to the known seat apparatus, the moving direction of the seat back is determined only when the seat back is moved to a predetermined position at which the position of the seat back corresponds to the moving direction of the seat back. According to the seat apparatus of the present invention, because the user's intention can be immediately reflected on the operation, the operationality can be further improved.

The controlling portion controls the seat back so as to stop when the certain operation is executed by the user, and when the certain operation is executed by the user while the seat back is stopped, the controlling portion controls the seat back to move in the first direction that is opposite to the second direction to which the seat back was moved before it is stopped. Thus, the operationality can be further improved. Further, the controlling portion controls the seat back to stop when it reaches the seating position or the table position. Thus, the operationality can be further improved.

The operating portion is an automatic returning type switch for outputting an operation signal when the automatic returning type switch temporally turns in an opened/closed state on the basis of the user's operation. In this case, when the operation signal is supplied to the controlling portion, the controlling portion controls the seat back so as to move between the seating position and the table position. In addition, the seat back can be moved only while the user operates the operating portion. The operating portion may be an automatic maintaining type switch for outputting an operation signal while the automatic maintaining type switch maintains its state in an opened/closed-state on the basis of the user's operation.

The controlling portion further includes a seat back fine-adjustment operating portion for supplying a fine-adjustment signal to the controlling portion in order to finely adjust an angle of the seat back relative to the seat cushion. In this case, when the user operates the operating portion for the first time since the seat back fine-adjustment operating portion is operated, it is appropriate that the seat back is moved toward the table position because the fact that the user finely adjusts the angle of the seat back (recline the seat back) can be considered that the user is seated on the seat apparatus. Thus, if the operating portion is operated at this point, it can be estimated that the user needs to move the seat back from the seating position to the table position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat apparatus comprising:
a seat main body movable between a seating position and a vertically lower storing position;
the seat main body comprising a seat cushion and a seat back;
the seat back being rotatable relative to the seat cushion, while the seat main body is in the seating position, between a table position in which the seat back overlies the seat cushion so that a back surface of the seat back is usable as a table and a seating-permitting position in which the seat back is positioned upright relative to the seat cushion in a manner permitting an individual to sit on the seat cushion;
a driving device operatively connected to the seat back to rotate the seat back relative to the seat cushion;
a controlling portion controlling the driving device;
a first operation switch connected to the controlling portion and operable by a user to move the seat main body between the seating position and the vertically lower storing position;
an auto actuation operation switch connected to the controlling portion and operable by the user to rotate the seat back between the table position and the seating-permitting position;
a seat back operation switch connected to the controlling portion and operable by the user to finely adjust an angle of the seat back relative to the seat cushion while the user is seated on the seat cushion by rotating the seat back relative to the seat cushion; and
the controlling portion controlling the driving device to automatically rotate the seat back to the table position, regardless of a position of the seat back, whenever the auto actuation operation switch is operated when the most recent rotation of the seat back was as a result of operation of the seat back operation switch.

2. The seat apparatus according to claim 1, wherein the driving device comprises a motor operatively connected to the seat back, the motor also moving the seat main body between the seating position and the vertically lower storing position.

3. The seat apparatus according to claim 1, wherein the controlling portion controls the seat back to stop when the seat back reaches the seating-permitting position or the table position.

4. The seat apparatus according to claim 1, wherein the driving device comprises a seat back motor operatively connected to the seat back, and further comprising a seat storing motor operatively connected to the seat main body to move the seat main body between the seating position and the stored position.

* * * * *